United States Patent [19]
Carson

[11] 3,882,015
[45] May 6, 1975

[54] COUNTERCURRENT CATALYTIC CONTACT OF A REACTANT STREAM IN A MULTI-STAGE PROCESS AND THE APPARATUS THEREFOR

[75] Inventor: Don B. Carson, Mt. Prospect, Ill.
[73] Assignee: Universal Oil Products Company, Des Plaines, Ill.
[22] Filed: May 29, 1973
[21] Appl. No.: 365,396

[52] U.S. Cl. ............... 208/169; 23/288 G; 48/214; 208/165
[51] Int. Cl. ......................... B01j 9/12; C10g 13/16
[58] Field of Search .......... 23/288 G; 208/169, 165

[56] References Cited
UNITED STATES PATENTS
2,922,757  1/1960  Oliver et al. ..................... 23/288 G
3,647,680  3/1972  Greenwood et al. ............. 23/288 G
3,706,536  12/1972  Greenwood et al. ............. 23/288 G Primary Examiner—Herbert Levine
Attorney, Agent, or Firm—James R. Hoatson, Jr.; Robert W. Erickson; William H. Page, II

[57] ABSTRACT

A unitary, multiple-stage reaction system for countercurrently contacting a fluid reactant stream with catalyst particles which are movable through said system via gravity-flow. Especially adaptable for use in both endothermic and exothermic conversion systems, the present reaction chamber provides for the introduction of a heat-exchange fluid between stages.

9 Claims, 1 Drawing Figure

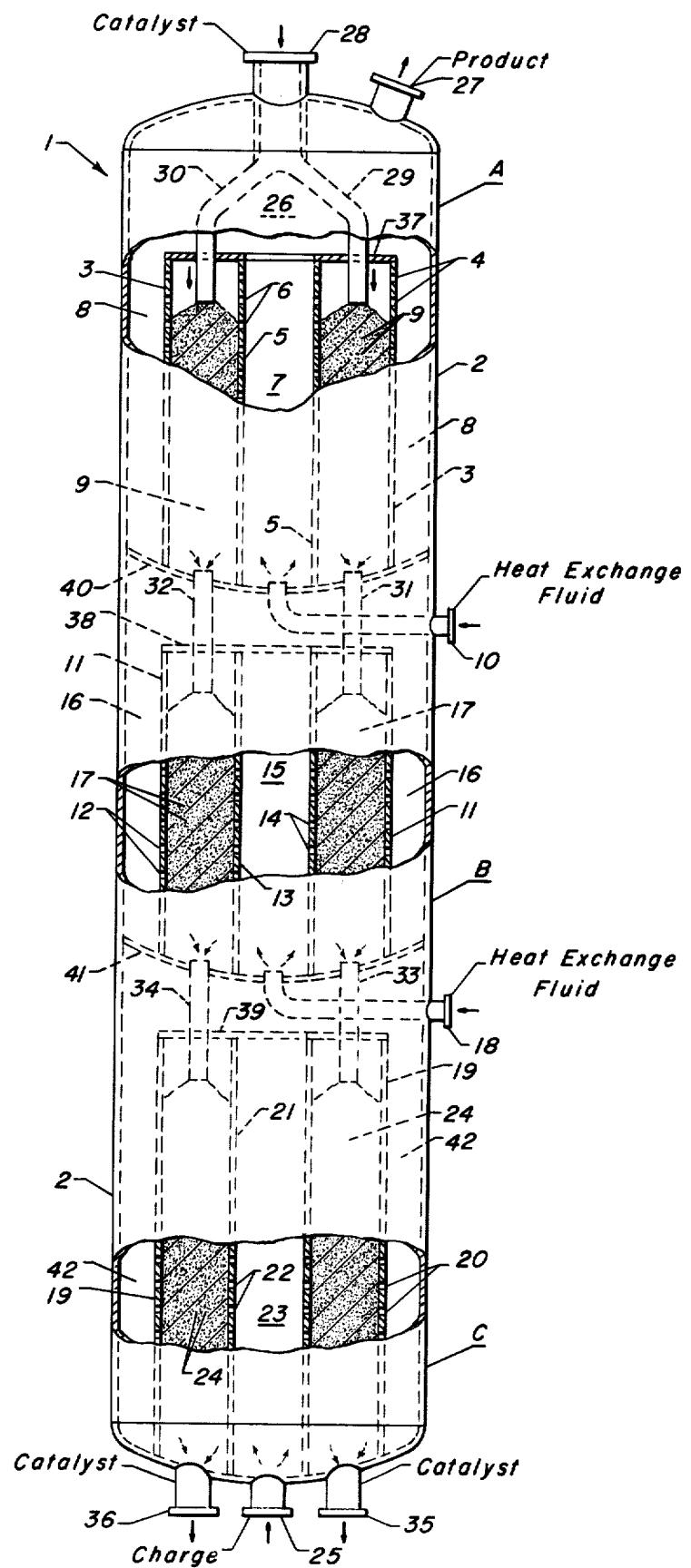

COUNTERCURRENT CATALYTIC CONTACT OF A REACTANT STREAM IN A MULTI-STAGE PROCESS AND THE APPARATUS THEREFOR

APPLICABILITY OF INVENTION

The present invention is directed to an improved means and method for effecting the multiple-stage catalytic contact of a reactant stream countercurrently, and, more particularly, to a process and system wherein the catalyst is movable via gravity-flow. Applicable to both exothermic and endothermic catalytic reactions, my invention provides for the introduction of a heat-exchange fluid stream into intermediate mixing zones between catalytic stages.

Various types of multiple-stage reaction systems have found widespread utilization throughout the petroleum and petrochemical industries for effecting multitudinous reactions, and especially hydrocarbon conversion reactions. Such reactions are either exothermic, or endothermic, and include hydrogen-producing and hydrogen-consuming reactions. Similarly, a wide spectrum of designs and arrangements have been proposed in order to effect the introduction of heating or cooling media into a reaction chamber at intermediate loci between the catalytic stages.

Multiple-stage reaction systems are generally of two types: (1) side-by-side configuration, with intermediate heating and/or cooling between zones, wherein the reactant stream or mixture flows serially from zone to zone; and, (2) a stacked design wherein a single reaction chamber contains the multiple contact stages. Such systems, as applied to petroleum refining, have been employed to effect numerous hydrocarbon conversion reactions including those prevalent in catalytic reforming, fixed-bed alkylation, ethylbenzene dehydrogenation to produce styrene, other dehydrogenation processes, hydrorefining, isomerization, desulfurization, hydrocracking, hydrogenation, transalkylation, steam reforming for substitute natural gas (SNG) production, etc. It will be immediately recognized that some of these processes are exothermic — e.g. hydrocracking — some are endothermic — e.g. ethylbenzene (EB) dehydrogenation — and some encompass both — e.g. catalytic reforming. It should be noted that these reactions are effected in vapor-phase, liquid-phase or mixed-phase, depending principally upon the charge stock characteristics and the ultimately desired product slate.

Traditionally, hydrocarbon conversion processes have been effected catalytically in a fixed-bed system, either in downward flow, upward flow, or in lateral/-radial flow wherein the catalyst is disposed as an annular-form bed. Many design and operating considerations indicate the advantages of annular-form radial flow, particularly in a vapor-phase operation. Illustrative of a reaction system, wherein the reactant feed stream is caused to flow laterally and radially through the catalyst, is that described in U.S. Pat. No. 2,683,654 (Cl. 23-288). The type of reactor shown is intended for the common fixed-bed system, either single-stage, or multiple-stage in side-by-side relation. The reactant stream flows from an outer annular-form space through a catalyst-retaining screen and catalyst particles disposed in another annular-form space, and into a perforated centerpipe, through the bottom of which it emanates from the reaction chamber.

U.S. Pat. No. 3,470,090 (Cl. 208-138) illustrates a side-by-side reaction system with intermediate heating of the reactant feed stream. This constitutes an example of a system in which the catalyst particles are movable via gravity-flow. Catalyst withdrawn from an individual reaction zone is sent to suitable regeneration facilities. This particular type of system can be modified such that the catalyst withdrawn from a given reaction zone is sent to the next succeeding reaction zone, while that catalyst withdrawn from the last reaction zone is transported to suitable regeneration facilities. Of more recent vintage is the "stacked" configuration as shown in U.S. Pat. No. 3,647,680 (Cl. 208-65); this is a two-stage system having an integrated regeneration facility which receives the catalyst withdrawn from the bottom reaction chamber. The latter two techniques make use of a downwardly-moving bed of catalyst particles through which the reactant stream flows laterally and radially.

It must be noted that none of these recognize countercurrent hydrocarbon processing, and certainly not in combination with a reaction system in which the catalyst particles are movable via gravity-flow. While it is recognized that some processes have been considered for countercurrent flow of the reactant stream, that is, flowing the feed stream upwardly through a fixed-bed of catalyst particles, there is no awareness of providing a countercurrent flow of the reactant stream with a downwardly-moving bed of catalyst particles.

As hereinbefore stated, the present inventive concept is directed toward a multiple-stage reaction system for countercurrently contacting a fluid reactant stream with catalyst particles movable through said system via gravity-flow. Although applicable to all the foregoing reactor configurations, processes and reactions, the present reaction chamber and process is most readily adaptable for use in effecting those reactions wherein the rate and degree of catalyst deactivation increases in the direction of reactant stream flow.

OBJECTS AND EMBODIMENTS

An object of my invention is to provide a multiple-stage reaction system for countercurrently contacting a fluid reactant stream with catalyst particles movable through the system via gravity-flow. A corollary objective resides in affording a reaction system having internal mixing zones to facilitate the introduction of a heat-exchange fluid intermediate the reaction zones and to enhance the mixing thereof with the reactant stream emanating from the preceding catalytic zone.

A more specific object is to afford a technique for effecting the countercurrent, vapor-phase contact of a reactant feed stream with catalyst particles movable through a multiple-stage system via gravity-flow.

Therefore, in one embodiment, my invention encompasses a unitary, multiple-stage reaction system for countercurrently contacting a fluid reactant stream with catalyst particles movable through said system via gravity-flow, which system comprises, in combination: (a) a tubular-form, vertically-disposed reaction chamber; (b) at least two reaction zones within said chamber, each of said zones having coaxially-disposed inner and outer tubular-form, catalyst-retaining screens forming (i) an annular-form catalyst-holding section therebetween, (ii) an annular-form void volume between the outer screen and the interior wall of said chamber and, (iii) a center reactant conduit, said reaction zones spaced apart to form a mixing zone therebetween; (c) a lower, imperforate transverse partition connected to said inner and outer screens, and to the interior wall of said chamber, said lower partition terminating at said inner catalyst-retaining screen, whereby at least one of said center reactant conduits is in open communication, at its lower extremity, with a mixing zone; (d) an upper, imperforate transverse partition, across said reactant conduit, connected to said inner and outer catalyst-retaining screens, said upper partition terminating at said outer screen, whereby at least one of said annular-form void volumes is in open communication, at its upper extremity, with a mixing zone; (e) catalyst-transfer conduits connecting a catalyst-holding section with the next succeeding lower catalyst-holding section, and catalyst-withdrawal conduits in the lowermost of said catalyst-holding sections, said withdrawal conduits extending downwardly through the lower extremity of said chamber, whereby catalyst particles flow via gravity from one catalyst-holding section to a lower catalyst-holding section and out of said chamber; (f) a reactant stream inlet port in the bottom of said chamber, in open communication with the lowermost center reactant conduit; (g) a catalyst inlet port in the upper end of said chamber, in open communication, via catalyst-transfer conduits, with the uppermost catalyst-holding section; and, (h) a reaction product outlet port in the upper end of said chamber, in open communication with the uppermost annular-form void volume.

Another embodiment involves providing a fluid inlet conduit between reaction zones, which conduit terminates within the mixing zone therebetween.

A specific embodiment relates to a process for effecting the multiple-stage, countercurrent contact and conversion of a reactant stream with catalyst particles movable through said stages via gravity-flow, which process comprises the steps of: (a) introducing said reactant stream into a central, lower portion of an elongated reaction chamber containing said multiple stages; (b) passing said reactant stream laterally, in radial flow, through a first annular-form catalyst bed in which the catalyst particles are movable via gravity-flow, and into a mixing zone above said first catalyst bed; (c) introducing a heat-exchange fluid into said mixing zone and passing the same upwardly, in admixture with the reactant stream effluent, into the lower portion of a center reactant stream conduit, and flowing said mixture laterally through a second annular-form catalyst bed in which the catalyst particles are movable via gravity-flow; and, (d) withdrawing the resulting converted reactant stream from an upper portion of said second catalyst bed.

Other objects and embodiments will become evident from the following, more detailed description of my invention concept, and the reaction system and process encompassed thereby. In two such other embodiments, the heat-exchange fluid effects either an increase, or decrease in the temperature of said reactant stream effluent.

SUMMARY OF THE INVENTION

As hereinabove set forth, the present invention is directed toward the multiple-stage contact and conversion of a fluid reactant stream countercurrently with catalyst particles which are movable through the reaction zone via gravity-flow. Countercurrent processing of a reactant stream has heretofore given rise to a host of difficulties and problems. Such problems primarily stem from the fact that the linear velocity of reactant or effluent vapors increases as they pass upwardly through the catalyst zone. As the linear velocity increases, fluidization of a packed catalyst bed can occur. This tends to destroy the optimum catalyst/reactant contact and induces catalyst breakage as a result of constant contact with internal equipment. In many processes, especially those which are significantly exothermic or endothermic, these difficulties are compounded by virtue of the necessity to utilize intermediate heat-exchange fluids which further increases the linear vapor velocity. Such processes include hydrocracking, especially for liquefied petroleum gas (LPG) production, steam reforming to product synthetic natural gas and ethylbenzene dehydrogenation to produce styrene, etc.

The above-mentioned processes, in addition to others, have a common characteristic respecting catalyst deactivation. This appears not to be dependent upon either upflow, or downflow contact of the catalyst with the reactant stream. In either situation, that portion of the catalyst which "sees" the reactant stream first will deactivate first and at a more rapid rate than the remaining portion of catalyst. As the zone of deactivated catalyst proceeds through the bed, less catalyst becomes available for effecting the desired reaction. Ultimately, of course, the entire bed of catalyst is deactivated and the unit must be shut down for regeneration or catalyst replacement. When utilizing a reaction system in which the catalyst particles are movable, via gravity-flow, from reaction stage to reaction stage, ultimately being withdrawn from the system, in combination with countercurrent flow of the reactant stream, it is possible to remove that catalyst which is deactivated first, while simultaneously introducing fresh catalyst into the uppermost stage to replenish that which is removed. The withdrawn catalyst can either be transported to on-site regeneration facilities, or discarded for metals recovery. This is dependent upon the cause of deactivation, and whether techniques exist to regenerate such catalyst. For example, hydrocracking for LPG production generally employs a catalyst of a Group VIII and/or Grout VI-B metal combined with a refractory inorganic oxide Group material — e.g. alumina-silica. Deactivation of this catalyst generally stems from coke deposition, and regeneration thereof is possible. On the other hand, a steam reforming catalyst — i.e. nickel on silica/alumina with modifiers such as magnesium oxide and/or copper-chromium complexes — deactivates as a result of the crystallite growth of the active metal, and is not readily subject to regeneration. In either situation, the utilization of my invention prolongs the continuous on-stream time between shut-downs.

An additional advantage resides in a decrease in the required catalyst inventory within the reaction chambers, especially with respect to catalyst which is not regenerable and must be unloaded. Situations of this nature are perhaps best exemplified by considering a multiple-stage steam reforming process for SNG production. Briefly, this process is generally effected in two stages of gasification, with split feed, followed by two stages of shift methanation to increase the methane concentration. Considering only the gasification stages, a typical unit designed to process about 24,000

Bbl./day of a naphtha feed, requires about 382,000 pounds of catalyst (total in both stages) to function for about 1½ years before a shut-down for catalyst replacement is required. This catalyst inventory can be decreased by as much as 20–60 percent through the use of the present inventive concept, without the need for a shut-down except for the normal, periodic turnarounds for maintenance purposes.

The multiple-stage reaction system herein described utilizes tubular-form components which may take any suitable shape such as triangular, square, oblong, diamond, etc. Many design, fabrication and technical considerations dictate the advantages of using components which are substantially circular in cross-section. While these will be evident to those processing the requisite skill in catalytic processing, mention of the most important consideration is warranted; that is, uniformity of catalyst flow throughout the system, while flowing the reactant stream laterally and radially therethrough. The basic component of the reaction system is a vertically-disposed reaction chamber containing at least two separate, individual reaction zones. These zones are formed by coaxially-disposed inner and outer catalyst-retaining screens. These screens form an annular catalyst-holding section therebetween and an annular-form void volume with the interior wall of the chamber. The inner catalyst-retaining screen provides a central reactant conduit into the lower portion of which the fresh reactant stream, or reactant stream effluent from a lower reaction zone, is introduced. Although the utilization of inner and outer catalyst-retaining screen members is preferred in forming the annular-form, catalyst-holding sections, the annular-form void volume and the center reactant conduit, these same essential elements can be formed through the utilization of perforated cylinders, or a combination thereof. The primary consideration is that the openings in either the screen members, or the perforated cylindrical member, be sized to prevent the migration of catalyst particles into the outer annular-form void volume, or into the center reactant conduit.

The reaction zones are spaced apart through the use of lower and upper transverse partitions disposed in such a manner that a mixing zone is provided between reaction stages. The lower, imperforate transverse partition extends to, and is connected with the interior wall of the reaction chamber, and is connected to both the inner and outer screen member; however, this transverse partition terminates at the inner catalyst-retaining screen such that the center reactant conduit is in open communication, at its lower extremity, with a mixing zone, or the reactant inlet conduit. The upper, imperforate transverse partition extends across said reactant conduit, and is connected to both the inner and outer catalyst-retaining screen members, but terminates at the outer screen in order that the annular-form void volume between the outer screen and the interior wall of the chamber is in open communication, at its upper extremity, with a mixing zone, or the product removal port.

Multiple catalyst-transfer conduits connect one catalyst-holding section with the next succeeding lower catalyst-holding section. With respect to the lowermost annular-form catalyst bed, catalyst withdrawal conduits extend therefrom downwardly through the lower extremity of the unitary chamber, both the transfer and withdrawal conduits numbering from about 6 to about 16. In order to assure uniform, downward flow of catalyst from one annular-form zone to another, or out of the reaction chamber, the catalyst conduits are uniformly spaced throughout the cross-sectional area of the catalyst bed. Similarly, a catalyst inlet port is disposed in the upper end of the reaction chamber, and is in open communication, via catalyst-transfer conduits, with the uppermost annular-form, catalyst-holding section. A heat-exchange fluid inlet conduit is provided between reaction zones, terminating within the mixing zone therebetween. In a preferred method of operation, the heat-exchange fluid inlet conduit discharges upwardly into the centrally-disposed reactant conduit. The precise character of the heat-exchange fluid is primarily dependent upon the process being effected, as well as whether the principal character of the reactions is exothermic, or endothermic. In the situation involving the hydrocracking of a normally liquid feed stock for LPG production, a highly exothermic reaction, the heat-exchange fluid may be hydrogen, a hydrocarbon stream such as unconverted feed stock which is being recycled, a portion of the desired product effluent, etc. In this particular situation, the heat-exchange fluid will effect a decrease in the temperature of the reactant stream effluent emanating from the lower reaction zone. Similarly, the steam reforming of hydrocarbons to produce a methane-rich, substitute natural gas, is a highly exothermic reaction. Experience dictates that the heat-exchange fluid effects a decrease in the temperature of the reactant stream effluent from the lower reaction zone, and will generally consist of a portion of the fresh feed charge stock in admixture with steam. An example of an endothermic reaction system is the dehydrogenation of ethylbenzene to produce styrene. This will entail the introduction of high temperature steam into the mixing zone in order to reheat the reactant stream for processing in the next succeeding upper reaction zone.

DESCRIPTION OF DRAWING

In further describing my invention, reference will be made to the accompanying drawing which shows an elongated reaction chamber 1 having three separate reaction zones "A", "B" and "C". For the sole purpose of illustration, and not with the intent of unduly limiting the present invention beyond the scope and spirit of the appended claims, it will be presumed that the various tubular-form components are substantially circular in cross-section and further that the reaction system is being utilized in a steam reforming process for the production of methane-rich SNG.

Steam reforming is generally effected with a steam to carbon ratio in the range of about 1.1 to about 6.0, and preferably from about 1.3 to about 4.0. The mixture is passed into a steam reforming reaction zone (generally multiple-stage) at a temperature such that the maximum catalyst bed temperature is in the range of about 800°F. to about 1100°F., and preferably from about 825°F. to about 1000°F. Steam reforming reactions are effected under an imposed pressure in the range of about 250 psig. to about 1500 psig., and preferably from about 400 psig. to about 1000 psig.

A wide variety of steam reforming catalytic composites are well known, and have been thoroughly described in the literature. In general, these catalysts utilize metallic components selected from Group VI–B and the iron-group of the Periodic Table. Also disclosed are the benefits to be accrued through the utilization of catalytic promotors selected from alkali and alkaline-earth metals. These catalytic components are generally combined with a suitable refractory inorganic oxide carrier material, either synthetically-prepared or naturally-occurring. One particularly suitable steam reforming catalyst is that described in U.S. Pat. No. 3,429,680 (Class 48–214), which catalyst utilizes a carrier material of kieselguhr and a catalytically active nickel component promoted by a copper-chromium, or copper-chromium-manganese complex, and which may, or may not be further promoted by the addition of an alkaline-earth metal oxide.

The reaction zone product effluent, principally comprising methane, carbon monoxide, carbon dioxide, hydrogen and steam is cooled to a temperature in the range of about 400°F. to about 800°F., preferably with an upper limit of about 650°F. The cooled effluent is then introduced into one or more shift methanation zones wherein the hydrogen and carbon monoxide are converted into additional methane. Following the separation of water and carbon dioxide, the resulting SNG has a heating value of from about 950 to about 1000 BTU per cubic foot. It is to this type of hydrocarbon processing that the present invention is particularly applicable; however, it is understood that there is no intent to so limit the scope of the appended claims.

Referring now to the drawing, reaction chamber 1 is shown as having three separate catalytic reaction zones "A", "B" and "C". Considering first the upper zone "A", the catalyst 9 is disposed in an annular-form bed contained within outer catalyst-retaining screen 3 and inner catalyst-retaining screen 5. Both screen members are perforated by openings 4 and 6, respectively. The catalyst-retaining screens 3 and 5 are coaxially-disposed to form center reactant conduit 7 and an annular-form void volume 8 between the outer screen 3 and the interior wall of chamber 2. A lower, imperforate transverse partition 40 is connected to outer screen 3 and inner screen 5, and to the interior wall of chamber 2; it is noted that partition 40 terminates at inner screen 5 so that center reactant conduit 7 is in open communication with the next lower annular-form void volume 16. Reaction zone "A" also contains an upper, imperforate transverse partition 37, connected to inner screen 5 and outer screen 3 such that reactant conduit 7 is sealed at the upper extremity thereof and annular-form void volume 8 is in open communication with product withdrawal area 26.

Similarly, with respect to reaction zone "B", annular-form catalyst bed 17 is disposed between outer retaining screen 11, containing perforations 12, and inner retaining screen 13, containing perforations 14; within inner screen 13, there is provided another center reactant conduit 15. Outer screen 11 forms an annular-form void volume 16 with the interior wall of chamber 2. An upper transverse partition 38 is disposed across center reactant conduit 15, and is connected to inner screen 13 and outer screen 11, terminating at the latter such that annular-form void volume 16 is in open communication with a mixing zone between reaction zone "A" and reaction zone "B". Heat-exchange fluid conduit 10 terminates within the mixing zone, and preferably discharges upwardly into center reactant conduit 7. A lower transverse partition 41 is provided in a manner similar to lower transverse partition 40, such that center reactant conduit 15 is in open communication, at its lower extremity, with a mixing zone between reaction zone "B" and reaction zone "C". A second heat-exchange fluid conduit 18 terminates within the mixing zone, between reaction zone "B" and reaction zone "C", and preferably discharges upwardly into center reactant conduit 15.

Reaction zone "C" is similarly defined by annular-form catalyst bed 24 being disposed between outer retaining screen 19, containing perforations 20, and inner retaining screen 21, containing perforations 22. Within inner retaining screen 21, there is provided another center reactant conduit 23. Outer retaining screen 19 forms an annular-form void volume 42 with the interior wall of chamber 2. An upper transverse partition 39 seals the upper extremity of conduit 23, but terminates at outer screen member 19 so that annular-form void volume 42 is in open communication with the intermediate mixing zone. A reactant stream inlet port 25 is in open communication with lowermost center reactant conduit 23. A reaction product outlet port 27 is provided for the removal of the product effluent from the upper area 26 of reaction chamber 2.

Catalyst particles are withdrawn from annular-form bed 24 by way of withdrawal conduits 35 and 36. These are but two of a multiple of withdrawal conduits, generally from about 6 to about 16, uniformly disposed throughout the cross-sectional area of catalyst bed 24. As catalyst is withdrawn via conduits 35 and 36, a like amount of catalyst is transferred from annular-form bed 17, by way of conduits 33 and 34, into annular-form catalyst bed 24. Similarly, catalyst is transferred from catalyst bed 9 into catalyst 17 by way of conduits 31 and 32. To replenish the quantity of catalyst withdrawn from chamber 2 by way of conduits 35 and 36, catalyst is introduced into the upper portion of reaction chamber 2 by way of catalyst inlet conduit 28 from which it is dispersed into annular-form catalyst bed 9 by way of transfer conduits 29 and 30. Transfer conduits 29 and 30, 31 and 32, and 33 and 34 also are representative of a multiplicity of conduits uniformly disposed throughout the annular cross-sectional area of the catalyst bed, and generally number from about 6 to about 16.

The adaptability of the multiple-stage reaction system hereinabove described, to the conversion of a hydrocarbon reactant stream, will be illustrated in conjunction with a commercially-scaled unit designed to produce a methane-rich gas from a naphtha boiling range charge stock. This feed stock has an initial boiling point of about 103°F., a 50.0% volumetric distillation temperature of about 163°F. and an end boiling point of about 275°F. The gravity, °API, is 70.0, and a component analysis indicates 20.0% by volume of naphthenes, 7.0% aromatics and 73.0% paraffins. The unit is designed to process the charge stock in an amount of about 60,000 lbs./hour, or 690.37 moles/hour. The charge stock is admixed with about 207.84 moles/hour of a recycle gas stream, the source of which is hereinafter set forth, and the mixture divided into two portions. The first portion of the charge stock/recycle gas mixture is commingled with 4,118.69 moles/hour of steam and raised to a temperature of 919°F. At a pressure of about 348 psig., the steam/hydrocarbon mixture is introduced into reaction chamber 2 by way of inlet conduit 25. A component analysis of the reactant stream entering via inlet conduit 25 is presented in the following Table I:

TABLE I

| Reactant Charge to Zone "C" | |
|---|---|
| Component | Mols/hr. |
| Naphtha | 389.85 |
| Steam | 4119.10 |
| Methane | 74.36 |
| Hydrogen | 14.86 |
| Carbon Monoxide | 2.30 |
| Carbon Dioxide | 25.44 |

Reaction chamber 2 contains a catalytic composite having an apparent bulk density of about 0.98 g/cc. The catalyst comprises a carrier material of kieselguhr, about 38.0% by weight of a nickel component (calculated as elemental nickel), about 9.0% by weight of magnesium oxide and about 7.5% by weight of a copper-chromium-manganese component in which the mole ratio of copper to chromium to manganese is 1.0:1.0:0.1. The reactant stream passes into center reactant conduit 23 and laterally through perforations 22 and inner catalyst-retaining screen 21. The reactant stream flows radially through annular-form catalyst bed 24, through catalyst-retaining screen 19 (having perforations 20 therein) and into annular-form void volume 42. In view of the fact that upper transverse partition 39 seals off the upper extremity of center reactant conduit 23, the reactant vapors are caused to flow laterally and radially through catalyst bed 24 into the outer annular-form void volume. The partially reacted stream flows into the mixing zone created by upper transverse partition 39 and lower transverse partition 41. At this point the exothermicity of the reaction has increased the temperature to about 964°F. Therefore, the remainder of the charge stock/recycle gas mixture (containing the remaining 300.52 moles/hour of fresh feed naphtha) is utilized as a heat-exchange fluid being introduced into the mixing zone by way of conduit 18; this heat-exchange fluid is at a temperature of 662°F., and effects a temperature reduction of the reactant stream to a level of 900°F. at the lower extremity of center reactant conduit 15. A component analysis of the material entering center reactant conduit 15 is presented in the following TABLE II:

TABLE II

| Reactant Charge to Zone "B" | |
|---|---|
| Component | Mols/hr. |
| Naphtha | 300.52 |
| Steam | 2763.56 |
| Methane | 1828.57 |
| Hydrogen | 572.53 |
| Carbon Monoxide | 34.63 |
| Carbon Dioxide | 707.69 |

The reactant stream flows laterally from center reactant conduit 15 through inner catalyst-retaining screen 13 having ports 14, and radially through annular-form catalyst bed 17. The product effluent passes through outer catalyst-retaining screen 11, containing perforations 12, and into the outer annular-form void volume 16 into the mixing zone formed by lower transverse partition 40 and upper transverse partition 38. The temperature of the reactant stream at this point is about 995°F. and, in order to lower the temperature to a level at which the shift methanation reaction will occur, a sufficient quantity of the ultimately produced methane-rich product, at a temperature of about 100°F., is upwardly introduced via conduit 10 into center reactant conduit 7. The product gas is utilized in an amount sufficient to lower the temperature of the material entering center reactant conduit 7 to a level of about 487°F. Again, the reactant screen flows from center reactant conduit 7 laterally through inner catalyst-retaining screen 5, radially through annular-form catalyst bed 9 and catalyst-retaining screen 3 into annular-form void volume 8. The product effluent vapors flow upwardly into withdrawal zone 26 and are removed from reaction chamber 2 by way of conduit port 27. A component analysis of the reactant stream entering inner reactant conduit 7 is presented in the following TABLE III:

TABLE III

| Reactant Charge to Zone "A" | |
|---|---|
| Component | Mols/hr. |
| Naphtha | — |
| Steam | 1836.44 |
| Methane | 3082.50 |
| Hydrogen | 615.68 |
| Carbon Monoxide | 95.52 |
| Carbon Dioxide | 1054.50 |

The quantities of the components shown in foregoing TABLE III do not include that portion of the final gaseous product recycled for the purpose of effecting the decrease in temperature to a level of about 487°F.

The temperature of the product effluent withdrawn via outlet conduit 27 is about 658°F., and a component analysis of this stream is presented in the following TABLE IV:

TABLE IV

| Product Effluent Analysis | |
|---|---|
| Component | Mols/hr. |
| Naphtha | — |
| Steam | 2021.20 |
| Methane | 3221.25 |
| Hydrogen | 153.42 |
| Carbon Monoxide | 2.78 |
| Carbon Dioxide | 1008.49 |

Where desired, the product effluent emanating via conduit 27 can be subjected to a second-stage, shift methanation technique to further reduce the concentration of hydrogen and carbon monoxide. In any event, water removal is effected by condensing the product effluent at a temperature of about 80°F. Carbon dioxide removal may be effected in any manner well known in the prior art. One such conventional manner involves mono-ethanolamine adsorption; another adsorption scheme utilizes hot potassium carbonate, while a third suitable technique employs a catalytic reaction system utilizing vanadium pentoxide as the catalyst. It is understood that neither the water removal, nor the carbon dioxide removal techniques are essential to the present invention, and are hereindescribed solely for the sake of completeness. Following the removal of water and carbon dioxide, the methane-rich SNG product has the analysis indicated in the following TABLE V:

TABLE V

| Methane-Rich SNG Product | |
|---|---|
| Component | Mols/hr. |
| Methane | 3213.58 |
| Hydrogen | 153.01 |
| Carbon Monoxide | 2.78 |
| Carbon Dioxide | 56.96 |
| Water | 6.00 |

This product gas has a heating value of about 730 BTU/cu.ft., which can be increased, through the use of a second methanation stage, to a level of about 750 BTU/cu.ft. Following water and $CO_2$ removal, the heating valve is increased to 980–1,000 BTU/cu.ft.

The foregoing is believed to illustrate the present reaction system for countercurrent processing with a gravity-flowing catalyst, and the benefits afforded through the utilization thereof.

I claim as my invention:

1. A unitary, multiple-stage reaction system for countercurrently contacting a fluid reactant stream with catalyst particles movable through said system via gravity-flow, which system comprises, in combination:
   a. a tubular-form, vertically-disposed reaction chamber;
   b. at least two reaction zones within said chamber, each of said zones having coaxially-disposed inner and outer tubular form, catalyst-retaining screens forming (i) an annular-form catalyst holding section therebetween, (ii) an annular-form void volume between the outer screen and the interior wall of said chamber and, (iii) a center reactant conduit, said reaction zones spaced apart to form a mixing zone therebetween;
   c. a lower, imperforate transverse partition connected to said inner and outer screens, and to the interior wall of said chamber, said lower partition terminating at said inner catalyst-retaining screen, whereby at least one of said center reactant conduits is in open communication, at its lower extremity, with a mixing zone;
   d. an upper, imperforate transverse partition, across said reactant conduit, connected to said inner and outer catalyst-retaining screens, said upper partition terminating at said outer screen, whereby at least one of said annular-form void volumes is in open communication, at its upper extremity, with said mixing zone;
   e. catalyst-transfer conduits connecting a catalyst-holding section with the next succeeding lower catalyst-holding section, and catalyst-withdrawal conduits in the lowermost of said catalyst-holding sections, said withdrawal conduits extending downwardly through the lower extremity of said chamber, whereby catalyst particles flow via gravity from one catalyst-holding section to a lower catalyst-holding section and out of said reaction chamber;
   f. a reactant stream inlet port in the bottom of said reaction chamber, in open communication with the lowermost center reactant conduit;
   g. a catalyst inlet port in the upper end of said chamber, in open communication, via catalyst-transfer conduits, with the uppermost catalyst-holding section;
   h. a reaction product outlet port in the upper end of said chamber, in open communication with the uppermost annular-form void volume; and,
   i. a heat exchange fluid inlet conduit between said reaction zones, said inlet conduit terminating within the mixing zone therebetween and being positioned to discharge upwardly into said center reactant conduit.

2. The reaction system of claim 1 further characterized in that said chamber contains three reaction zones and a second heat exchange fluid inlet conduit is positioned to terminate the discharge upwardly into the second of said reaction zones.

3. A process for effecting the multiple-stage, countercurrent contact and conversion of a reactant stream with catalyst particles movable through said stages via gravity-flow, which process comprises the steps of:
   a. introducing said reactant stream into a central, lower portion of an elongated reaction chamber containing said multiple stages;
   b. passing said reactant stream laterally, in radial flow, through a first annular-form catalyst bed in which the catalyst particles are movable via gravity-flow, and into a mixing zone above said first catalyst bed;
   c. introducing a heat-exchange fluid into said mixing zone and passing the same upwardly, in admixture with the reactant stream effluent, into the lower portion of a center reactant stream conduit, and flowing said mixture laterally through a second annular-form catalyst bed in which the catalyst particles are movable via gravity-flow; and,
   d. withdrawing the resulting converted reactant stream from an upper portion of said second annular-form catalyst bed.

4. The process of claim 3 further characterized in that said reaction chamber contains three annular-form movable catalyst beds and a heat-exchange fluid medium is introduced into each of the two mixing zones therebetween.

5. The process of claim 3 further characterized in that said heat-exchange fluid effects an increase in the temperature of said reactant stream effluent.

6. The process of claim 3 further characterized in that said heat-exchange fluid effects a decrease in the temperature of said reactant stream effluent.

7. The process of claim 3 further characterized in that said heat-exchange fluid comprises a hydrocarbon.

8. The process of claim 3 further characterized in that said heat-exchange fluid comprises hydrogen.

9. The process of claim 3 further characterized in that said heat-exchange fluid comprises steam.

* * * * *